(12) United States Patent
Gagné et al.

(10) Patent No.: US 11,587,570 B2
(45) Date of Patent: Feb. 21, 2023

(54) INTERACTIVE PLAYGROUND SYSTEM WITH ENHANCED USER INTERACTION AND COMPUTERIZED METHOD FOR PROVIDING ENHANCED USER INTERACTION IN A PLAYGROUND SYSTEM

(71) Applicant: TECHNOLOGIES UGO INC., Bécancour (CA)

(72) Inventors: Carolyne Gagné, Deschaillons-sur-Saint-Laurent (CA); Steve Couture, Québec (CA); Jean-Philippe Auclair, Québec (CA); Jean-Philippe Doiron, Sainte-Catherine-De-La-Jacques-Cartier (CA)

(73) Assignee: TECHNOLOGIES UGO INC., Becancour (CA)

( * ) Notice: Subject to any disclaimer, the term of this patent is extended or adjusted under 35 U.S.C. 154(b) by 7 days.

(21) Appl. No.: 16/650,665

(22) PCT Filed: Sep. 25, 2018

(86) PCT No.: PCT/CA2018/051206
§ 371 (c)(1),
(2) Date: Mar. 25, 2020

(87) PCT Pub. No.: WO2019/056132
PCT Pub. Date: Mar. 28, 2019

(65) Prior Publication Data
US 2021/0201914 A1 Jul. 1, 2021

Related U.S. Application Data

(60) Provisional application No. 62/562,745, filed on Sep. 25, 2017.

(51) Int. Cl.
*G10L 15/30* (2013.01)
*A63G 31/00* (2006.01)
(Continued)

(52) U.S. Cl.
CPC .............. *G10L 15/30* (2013.01); *A63G 31/00* (2013.01); *G06V 20/13* (2022.01); *G10L 15/083* (2013.01)

(58) Field of Classification Search
CPC ........ G10L 15/30; G10L 15/083; G06V 20/13
(Continued)

(56) References Cited

U.S. PATENT DOCUMENTS

| 6,174,242 B1 | 1/2001 | Briggs et al. |
| 6,352,478 B1 | 3/2002 | Gabai et al. |

(Continued)

FOREIGN PATENT DOCUMENTS

| WO | 2009125328 | 10/2009 |
| WO | 2017006312 | 1/2017 |

OTHER PUBLICATIONS

Wicksteed, "Wicksteed's Interactive Play Systems Bring Fun to School Play Areas," Fitness Gaming, retrieved from http://www.fitness-gaming.com/news/markets/schools/wicksteeds-interactive-play-systems-bring-fun-to-school-play-areas.html#.WThIHWgrKUk. published Jun. 3, 2016.
(Continued)

*Primary Examiner* — Susan I McFadden
(74) *Attorney, Agent, or Firm* — Andrus Intellectual Property Law, LLP

(57) ABSTRACT

An interactive playground system including a user interface including a speaker and at least one of a microphone and a camera; a plurality of nodes distributed over a surface of the playground system, each one of the nodes including a printed circuit board with at least one sensor and at least one
(Continued)

output component connected thereto; and a central unit in data communication with the plurality of nodes. The central unit comprises a memory and a processor; at least one of a speech recognition module and a motion recognition module and an interaction control module in data communication with the at least one of the speech recognition module and the motion recognition module, the speaker and the nodes. The interaction control module implements at least one of conversation instructions through output of audio data on the speaker and game action instructions through control of the output components of the nodes.

15 Claims, 10 Drawing Sheets

(51) Int. Cl.
*G10L 15/08* (2006.01)
*G06V 20/13* (2022.01)

(58) Field of Classification Search
USPC ........................................................ 704/270.1
See application file for complete search history.

(56) References Cited

U.S. PATENT DOCUMENTS

| | | | |
|---|---|---|---|
| 8,047,925 B2 | 11/2011 | Burgaard et al. | |
| 8,142,298 B2 | 3/2012 | King et al. | |
| 8,241,182 B2 | 8/2012 | Julskajer et al. | |
| 8,460,103 B2 * | 6/2013 | Mattice | G07F 17/32 463/16 |
| 8,684,839 B2 * | 4/2014 | Mattice | G10L 17/00 463/43 |
| 8,758,109 B2 * | 6/2014 | Lutnick | G07F 17/3293 463/16 |
| 8,932,124 B2 * | 1/2015 | Lutnick | G07F 17/3225 463/19 |
| 9,070,242 B2 * | 6/2015 | Kosta | A63F 13/20 |
| 9,595,169 B2 * | 3/2017 | Lutnick | G07F 17/3276 |
| 9,743,242 B2 * | 8/2017 | Huang | G01S 11/06 |
| 9,916,839 B1 * | 3/2018 | Scalise | G10L 21/00 |
| 10,755,723 B1 * | 8/2020 | Scalise | G10L 15/22 |
| 10,898,812 B2 * | 1/2021 | Zimring | G06F 9/44568 |
| 11,106,273 B2 * | 8/2021 | Hazra | G06F 3/015 |
| 11,126,140 B2 * | 9/2021 | Eom | G06F 3/017 |
| 2008/0293470 A1 | 11/2008 | Proud et al. | |
| 2013/0063009 A1 | 3/2013 | Hayne et al. | |
| 2015/0061417 A1 | 3/2015 | Aleksiev et al. | |
| 2015/0118670 A1 | 4/2015 | Jespersen et al. | |
| 2016/0253911 A1 | 9/2016 | Jespersen et al. | |
| 2016/0275336 A1 | 9/2016 | Park et al. | |

OTHER PUBLICATIONS

Moreno et al., "Socially Aware Interactive Playgrounds," retrieved from https://pdfs.semanticscholar.org/bea2/bcfe6c1f883d442914ca2928afc18b5a8005.pdf on Dec. 6, 2013.

Exergame, "Fitness & Game Products," retrieved from https://www.exergamefitness.com/products/active-wall-games/, published Jun. 7, 2017.

International Search Report and Written Opinion for PCT/CA2018/051206, dated Jan. 18, 2019.

* cited by examiner

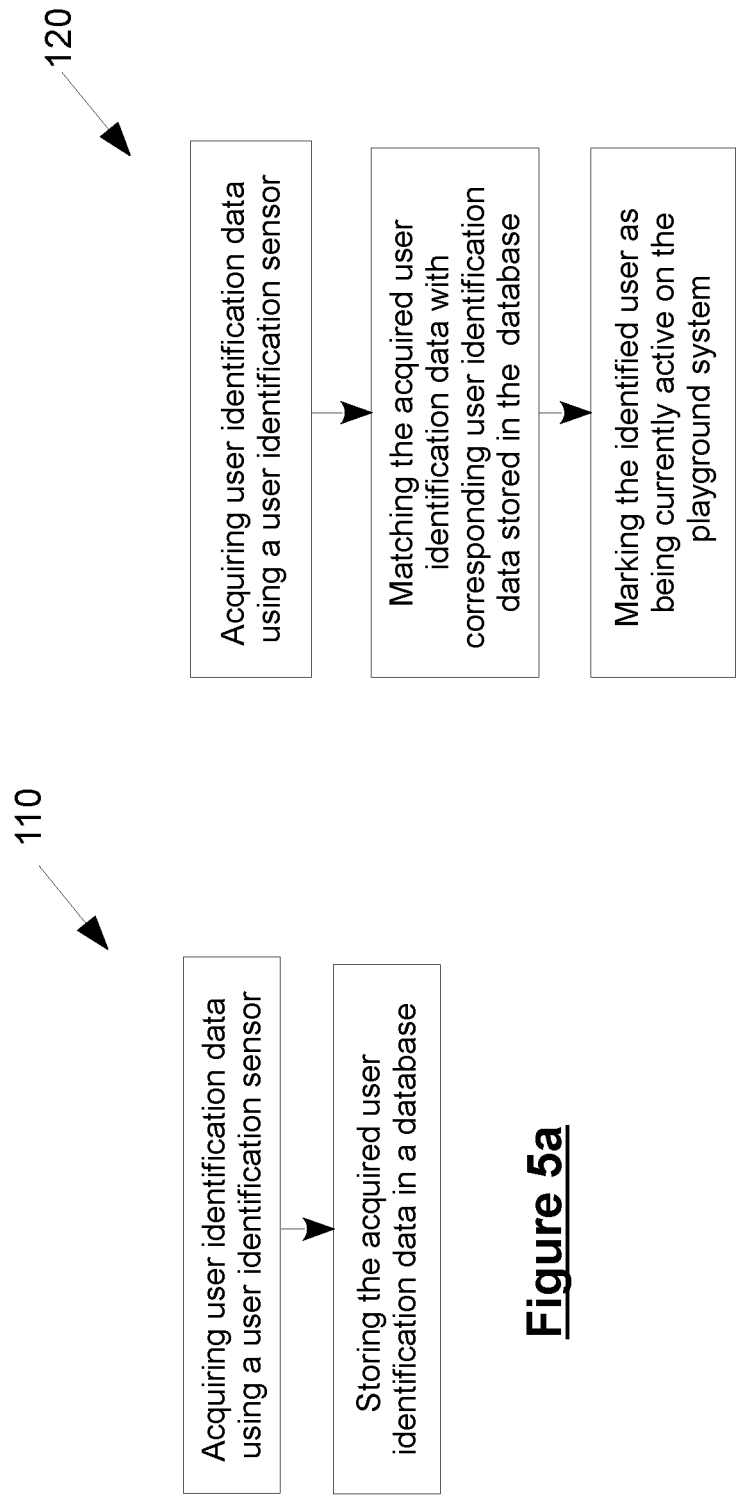

INTERACTIVE PLAYGROUND SYSTEM WITH ENHANCED USER INTERACTION AND COMPUTERIZED METHOD FOR PROVIDING ENHANCED USER INTERACTION IN A PLAYGROUND SYSTEM

CROSS-REFERENCE TO RELATED APPLICATIONS

This application is a US National Phase of PCT/CA2018/051206, filed on Sep. 25, 2018 and published as WO 2019/056132A1, which claims priority under 35 USC § 119(e) of US provisional patent application(s) 62/562,745 filed on Sep. 25, 2017, the specification(s) of which being hereby incorporated by reference.

TECHNICAL FIELD OF THE INVENTION

The present invention relates to the field of interactive playground systems. More particularly, it relates to an interactive playground system having enhanced user management and interaction capabilities, for example and without being limitative allowing the system to provide personalised interaction with users thereof and to a computerized method for providing such enhanced user management and interaction capabilities for the playground system.

BACKGROUND

Playground systems are structures commonly found in parks, schoolyards, daycare, campground and the like and which allow users to play while performing physical activities. Traditionally, playground systems include physical structures and components such as, for example and without being limitative, swings, chutes, climbing nets, ladders, see-saws and platforms interconnected by structures such as, for example and without being limitative, ladders, net bridges, bars, ropes, tunnels, or the like, such that users can play while moving around the playground.

In recent years, new types of playground systems with integrated electronic components have been developed. Such playground systems with integrated electronic components can, for example, include a central processing unit which can receive sensor signals indicative of user activities from sensors distributed over the surface of the structure and provide interactive game action (for example by lighting lights distributed over the structure), with the users performing user actions in reaction to the game play action (e.g. in reaction to lighting of the lights).

Such playground systems however tend to suffer from several drawbacks. For example and without being limitative, known playground systems simply allow user to select the desired type of game, using traditional user interface or controls, thereby limiting the user experience. Moreover, known playground systems do not allow vocal (or motion based) interactions between the users and the playground system, again limiting the user experience. Furthermore, known playground systems do not offer personalized interaction, game play, or the like to the players using the playground, which also negatively impacts the experience of the players.

In view of the above, there is a need for an improved interactive playground system with enhanced user management and interaction capabilities and/or for a computerized method for providing enhanced user management and interaction capabilities in a playground system which would be able to overcome or at least minimize some of the above-discussed prior art concerns.

BRIEF SUMMARY OF THE INVENTION

In accordance with a first general aspect, there is provided an interactive playground system. The system comprises a user interface including a speaker and at least one of a microphone and a camera; a plurality of nodes distributed over a surface of the playground system, each one of the nodes including a printed circuit board with at least one sensor and at least one output component connected thereto; and a central unit in data communication with the plurality of nodes. The central unit comprises a memory and a processor; at least one of a speech recognition module in data communication with the microphone and a speech recognition service and a motion recognition module in data communication with the camera and a motion recognition service and an interaction control module in data communication with the at least one of the speech recognition module and the motion recognition module, the speaker and the nodes. The speech recognition module acquires user speech data from the microphone, transmits the user speech data to the speech recognition service, obtains interpretation data from the speech recognition service and generates user interaction instructions based on the interpretation data. The motion recognition module acquires user motion data from the camera, transmits the user motion data to the motion recognition service, obtains interpretation data from the motion recognition service and generates user interaction instructions based on the interpretation data. The user interaction instructions are one of conversation instructions and game action instructions. The interaction control module implements at least one of the conversation instructions through output of audio data on the speaker and the game action instructions through control of the output components of the nodes.

In an embodiment, at least one of the nodes and the central unit comprises a user identification sensor and the central unit comprises a user identification module in data communication with the user identification sensor and a user identification database. The user identification module acquires user identification data from the user identification sensor and identifies the user by comparing the user identification data with user identification data of the user identification database.

In an embodiment, the user identification sensor includes the camera of the user interface.

In an embodiment, the central unit further comprises a personalised interaction management module in data communication with the user identification module. The personalised interaction management module receives personal user data relative to the user identified by the user identification module, processes the personal user data and generates user specific conversation instructions therefrom. The interaction control module implements at least one of the conversation instructions and the user specific conversation instructions through output of audio data on the speaker.

In an embodiment, the personalised interaction management module analyzes the use of the playground system by the user over time, generates user preference data specific to the user and generates personalised user interaction instructions based on the user preference data. The generated personalised user interaction instructions are one of the conversation instructions to be implemented by the interaction control module through output of audio data on the speaker and the game action instructions to be implemented by the interaction control module through control of the output components of the nodes.

In an embodiment, the personalised interaction management module is in data communication with a user preference data database. The personalised interaction management module transmits the user preference data to the user preference data database for storage and subsequently retrieving the user preference data therefrom.

In an embodiment, the playground system includes at least one of a contextual source and a contextual sensor and the personalised interaction management module is in data communication therewith and receives contextual data therefrom. The personalised interaction management module processes the contextual data and generates contextual user interaction instructions. The generated contextual user interaction instructions are one of the conversation instructions to be implemented by the interaction control module through output of audio data on the speaker and the game action instructions to be implemented by the interaction control module through control of the output components of the nodes.

In an embodiment, the personalised interaction management module processes the contextual data in combination with the personal user data and the user preference data to generate the contextual user interaction instructions.

In an embodiment, the at least one output component connected to the printed circuit board of at least one of the plurality of nodes includes at least one of a speaker and a light emitter.

In an embodiment, each one of the nodes includes a processor and memory.

In an embodiment, the playground system is connected to at least one remote playground system via a network.

In accordance with another general aspect there is also provided, a computer implemented method for providing personalized user interaction in a playground system having a user identification sensor, a microphone, a speaker and nodes including output elements, the method comprises: a user identification process; a speech recognition process and a personalised instruction process. The user identification process includes acquiring user identification data of the user from the user identification sensor; matching the user identification data with corresponding user identification data stored in a database to identify the current user; and marking the identified user as being currently active on the playground system. The speech recognition process includes acquiring user speech data from the microphone; interpreting the acquired user speech data; generating user interaction instructions based on the interpreted user speech data, the generated user interaction instructions being one of conversation instructions and game action instructions; and at least one of implementing the conversation instructions through output of audio data by the speaker and implementing the game action instructions through control of the output components of the nodes. The personalised instruction process includes: receiving personal user data; processing the personal user data; generating user specific conversation instructions; and implementing the user specific conversation instructions through output of audio data by the speaker.

In an embodiment, the playground system includes a camera and the method further comprises a motion recognition process including: acquiring user motion data from the camera; interpreting the acquired user motion data; generating the user interaction instructions based on the interpreted user motion data, the generated user interaction instructions being one of the conversation instructions and the game action instructions; and at least one of implementing the conversation instructions through output of audio data by the speaker and implementing the game action instructions through control of the output components of the nodes.

In an embodiment, the user identification process includes an initialization phase including, for each user, acquiring user identification data relative to the user and storing the acquired user identification data in a database.

In an embodiment, the initialization phase further includes acquiring the personal user data from the user and storing the personal user data in a database.

In an embodiment, the personalised instruction process further includes: analyzing the use of the playground system by the user over time; generating user preference data specific to the user based on the analysis; generating personalised user interaction instructions based on the user preference data, the generated personalised user interaction instructions being one of the conversation instructions and the game action instructions; and at least one of implementing the conversation instructions through output of audio data by the speaker and implementing the game action instructions through control of the output components of the nodes.

In an embodiment, the personalised instruction process further includes storing the user preference data in a database and subsequently retrieving the user preference data therefrom.

In an embodiment, the playground system includes at least one of a contextual input source and a contextual input sensor and the personalised instruction process further includes: acquiring contextual data from the at least one of the contextual input source and the contextual input sensor; processing the contextual data; generating contextual user interaction instructions, the generated contextual user interaction instructions being one of the conversation instructions and the game action instructions; and at least one of implementing the conversation instructions through output of audio data by the speaker and implementing the game action instructions through control of the output components of the nodes.

In an embodiment, the method further includes connecting a playground system to at least one remote playground system over a network.

In an embodiment, the method further includes performing a game action including at least two users, where each user is identified as active in its corresponding playground system and the playground systems of each user are remote from one another.

In accordance with another general aspect, there is further provided a computer implemented method for providing personalized user interaction in a playground system having a user identification sensor, a camera, a speaker and nodes including output elements. The method comprises: a user identification process; a motion recognition process and a personalised instruction process. The user identification process includes: acquiring user identification data of the user from the user identification sensor; matching the user identification data with corresponding user identification data stored in a database to identify the current user; and marking the identified user as being currently active on the playground system. The motion recognition process includes: acquiring user motion data from the camera; interpreting the acquired user motion data; generating user interaction instructions based on the interpreted user motion data, the generated user interaction instructions being one of conversation instructions and game action instructions; and at least one of implementing the conversation instructions through output of audio data by the speaker and implementing the game action instructions through control of the output components of the nodes. The personalised instruction process includes: receiving personal user data; processing the personal user data; generating user specific conversation instructions; and implementing the user specific conversation instructions through output of audio data by the speaker.

In an embodiment, the playground system includes a microphone and the method further comprising a speech recognition process including: acquiring user speech data from the microphone; interpreting the acquired user speech data; generating the user interaction instructions based on the interpreted user speech data, the generated user interaction instructions being one of conversation instructions and game action instructions; and at least one of implementing the conversation instructions through output of audio data by the speaker and implementing the game action instructions through control of the output components of the nodes.

In an embodiment, the user identification process includes an initialization phase including, for each user, acquiring user identification data relative to the user and storing the acquired user identification data in a database.

In an embodiment, the initialization phase further includes acquiring the personal user data from the user and storing the personal user data in a database.

In an embodiment, the personalised instruction process further includes: analyzing the use of the playground system by the user over time; generating user preference data specific to the user based on the analysis; generating personalised user interaction instructions based on the user preference data, the generated personalised user interaction instructions being one of the conversation instructions and the game action instructions; and at least one of implementing the conversation instructions through output of audio data by the speaker and implementing the game action instructions through control of the output components of the nodes.

In an embodiment, the personalised instruction process further includes storing the user preference data in a database and subsequently retrieving the user preference data therefrom.

In an embodiment, the playground system includes at least one of a contextual input source and a contextual input sensor and the personalised instruction process further includes: acquiring contextual data from the at least one of the contextual input source and the contextual input sensor; processing the contextual data; generating contextual user interaction instructions, the generated contextual user interaction instructions being one of the conversation instructions and the game action instructions; and at least one of implementing the conversation instructions through output of audio data by the speaker and implementing the game action instructions through control of the output components of the nodes.

In an embodiment, the method further includes connecting a playground system to at least one remote playground system over a network.

In an embodiment, the method further includes performing a game action including at least two users, where each user is identified as active in its corresponding playground system and the playground systems of each user are remote from one another.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 5 presents the overall processes of the method, FIG. 5a presents the steps of an initialisation phase of a user identification process, FIG. 5b presents the steps of a user recognition phase of the user identification process, FIG. 5d presents the steps of a motion recognition process and FIG. 5e presents the steps of a personalised instruction process.

DETAILED DESCRIPTION

Figure 1:
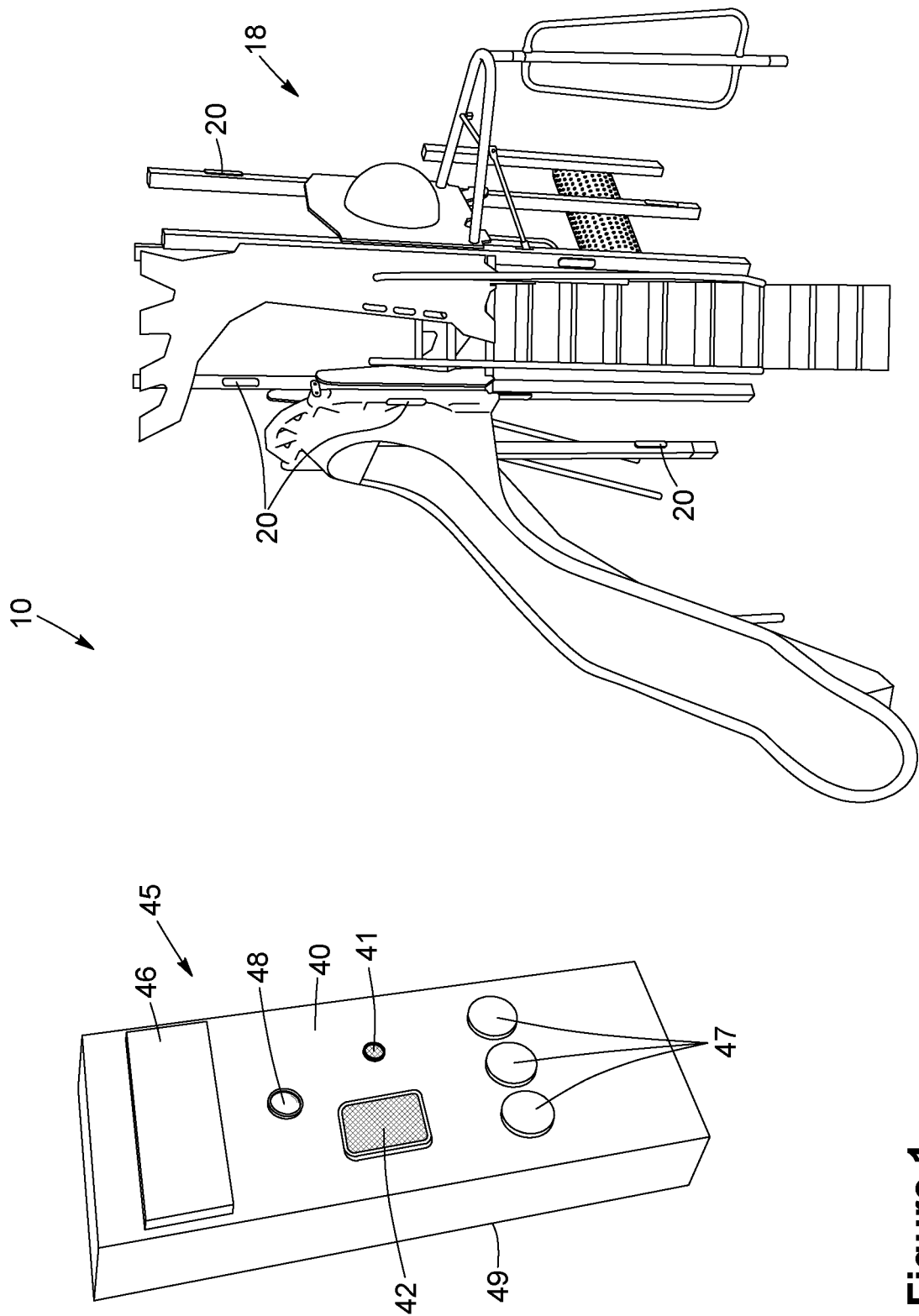
FIG. 1 is a perspective view of a playground system, showing the components thereof, in accordance with an embodiment.
Figure 1A:
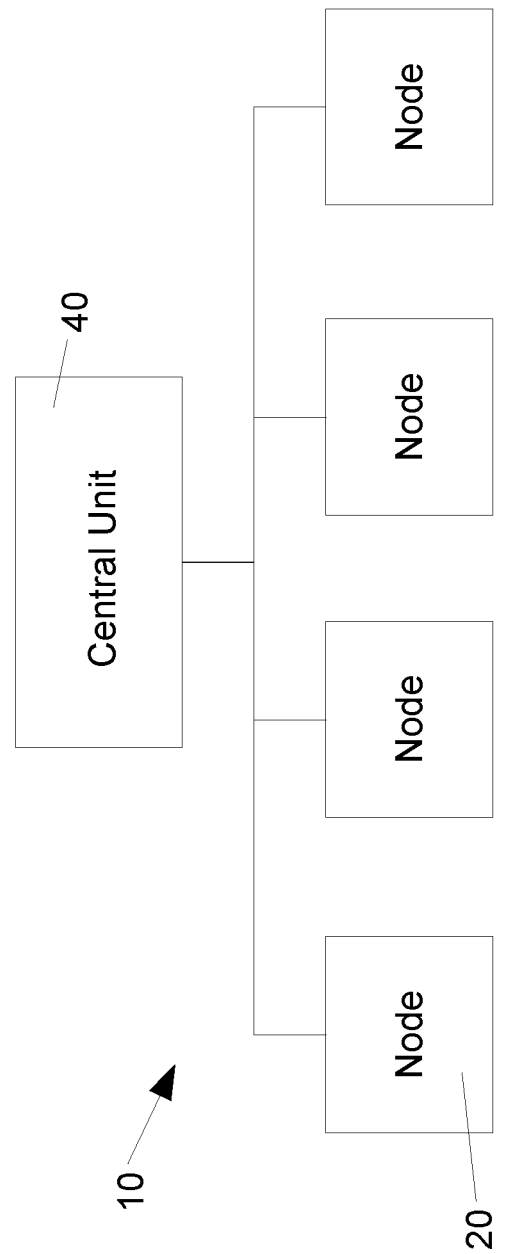
FIG. 1a is a schematic representation of a playground system, including the components thereof, in accordance with an embodiment.
Figure 2:
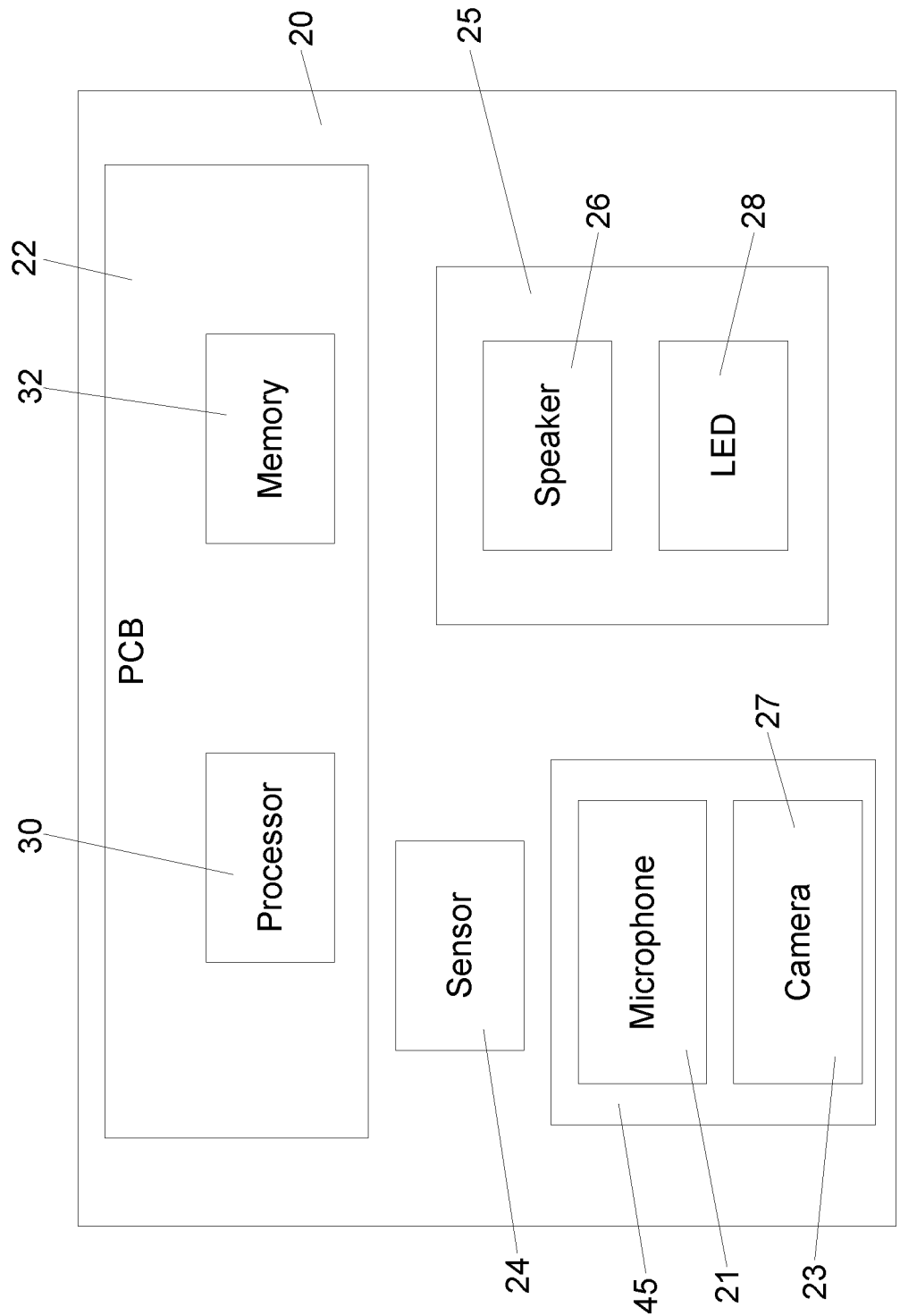
FIG. 2 is a schematic representation of a node of a plurality of nodes of the playground system of FIG. 1.

In the following description, the same numerical references refer to similar elements. The embodiments, geometrical configurations, materials mentioned and/or dimensions shown in the figures or described in the present description are embodiments only, given solely for exemplification purposes.

Although the embodiments of the interactive playground system with personalized interaction and corresponding parts thereof consist of certain components as explained and illustrated herein, not all of these components are essential and thus should not be taken in their restrictive sense. It is to be understood, as also apparent to a person skilled in the art, that other suitable components and cooperation thereinbetween may be used for the interactive playground system with enhanced user interaction, as will be briefly explained herein and as can be easily inferred herefrom by a person skilled in the art.

Moreover, although the embodiments described below comprise particular steps of a method, not all of these steps are essential and thus should not be taken in their restrictive sense. It is to be understood, as also apparent to a person skilled in the art, that other suitable configurations may be used for the method, as will be briefly explained herein and as can be easily inferred herefrom, by a person skilled in the art, without departing from the scope of the invention.

In the course of the present description, the term "user" will be used in the singular form in reference with a person (or player) making use of the playground system. However, one skilled in the art will understand that a plurality of users (or players) can use the playground system simultaneously or sequentially. Moreover, one skilled in the art will understand that the personalised interaction(s) can relate to a group of users rather to a single user, even in view of the use of the singular form of the term "user", the singular form being used throughout the present description simply to ease the description.

Referring generally to FIGS. 1 to 4, in accordance with one embodiment, there is provided a playground system 10 provided with electronic components, including a central unit 40 and a plurality of nodes 20 distributed over the surface of the playground structure 18 of the playground system 10 and connected to the central unit 40 (i.e. being in data communication with the central unit 40), which allows the playground system 10 to be interactive and immersive for a user making use thereof. As will be described in more details below, in an embodiment, the nodes 20 can be retrofitted onto a traditional playground structure 18 and connected to a corresponding central unit 40, to build an interactive playground system 10 such as described below, from a traditional playground structure.

In an embodiment, each one of the nodes 20 includes a printed circuit board (PCB) 22 with at least one sensor 24 connected to the PCB 22 and operative to detect an action of the user (i.e. operative to detect an interaction between a user and the playground system 10). One skilled in the art will understand that different types of sensors 24 can be used. For example and without being limitative, the sensor 24 can be a movement detection sensor sensing movements of the user in a section of the playground structure 18 or in proximity thereof or a movement of a physical component of the playground structure 18, a rotation sensor detecting a rotation of a physical component of the playground structure 18, a press button detecting when it is pressed by a user, a proximity sensor or the like.

In an embodiment, each node 20 further includes at least one output component 25. In an embodiment, the at least one output component 25 includes a speaker 26 and a light emitter 28 connected to the PCB 22. In an embodiment, the light emitter 28 includes light emitting diodes (LED) for providing lighting. One skilled in the art will however understand that, in alternative embodiments, the light emitter 28 could be of a different type, such as for example and without being limitative, the incandescent lighting type, gas discharge lighting type or the like.

One skilled in the art will understand that, in an alternative embodiment (not shown), only one of the speaker 26 or the light emitter 28 can be provided as output component 25 for each node 20. Moreover, in other alternative embodiments (not shown), other output components 25 providing visual, acoustic, olfactive and/or tactile outputs to the user can also be provided in at least one of the nodes 20, with the output component 25 being connected to the corresponding PCB 22.

Given that playground systems 10 are often installed in urban settings, it will be understood that the use of distributed sounds over numerous speakers 26 (each speaker 26 being associated to a corresponding node 20 of the playground systems 10 and therefore being distributed over the playground structure 18) is advantageous. Indeed, the distribution of sounds over numerous speakers 26 included in nodes 20 distributed over the playground structure 18 helps providing an immersive user experience (in comparison to sounds emitted from a single speaker or from a limited number of speakers), while reducing the overall sound level of the playground system 10 and thereby minimizing the acoustic impact for neighbouring residents, industries, schools, etc.

In an embodiment, the PCB 22 of each node 20 also includes (or is connected to) a processor 30 and a memory 32 storing at least instructions to be executed by the processor 30. In an embodiment, the memory 32 includes at least minimal memory space to store local output data and the processor 30 includes at least minimal processing power to acquire local sensor data, process the local sensor data and execute instructions to control the at least one output component 25 of the node 20 (e.g. the speaker 26 and/or the light emitter 28) based on the processed local sensor data. In the course of the present description, the term "local sensor data" refers to data acquired using the sensor 24 of the specific node 20 and the term "local output data" refers to data to be locally and selectively outputted, using the output component(s) 25 of the specific node 20. For example and without being limitative, in an embodiment, the local output data can be audio data that can be outputted through the speaker 26 of the corresponding node 20, lighting data that can be outputted through the light emitter 28 of the corresponding node, etc.

Hence, in an embodiment, each one of the nodes 20 can, for example, be operative to acquire data relative to the action detected by the sensor 24 (i.e. the local sensor data), locally process the local sensor data, and respond by playing selected audio data stored in its memory 32 (using its speaker 26) and/or by emitting light according to selected lighting data stored in its memory 32 (using the light emitter 28), using its own processor 30 and memory 32. Such an embodiment allows fast response time for the above-mentioned response specific to the detected user action detected using the sensor 24 of the corresponding node 20.

In view of the above, the nodes 20 of the playground system 10 each allow interaction with the user, using different gameplay patterns where the user must react to outputs from the output component(s) 25 (for example the speaker 26 or light emitter 28) of the nodes 20 and the actions of the user are detected using the sensor 24, and used to trigger new outputs from the output component(s) 25 (for example the speaker 26 and/or light emitter 28). For example, a light game can be played by the user where, the user must move around the playground structure of the playground system 10 and "capture" (or identify) (for example by pushing a push button or using a movement sensor) the nodes 20 having a light emitter 28 that is lit (or the nodes 20 having a light emitter 28 that is lit with a specific color). Different lighting patterns and sequences can be used to challenge the user and score can be associated to speed and accuracy of the user in the "capture" of the nodes 20.

In an embodiment, a user interface 45, which will be described in more details below, can be used to initially select a game to be played by the user and the central unit 40 can be used to control the nodes 20 (i.e. to provide operating instructions for output components 25 of the nodes 20 during game play) to perform the different games.

The central unit 40 is the physical component including the main computing device of the playground system 10 to which the plurality of nodes 20 are connected. In other words, each one of the nodes 20 is in data communication with the central unit 40, with the central unit 40 being configured to control the nodes 20 to provide game action (i.e. providing operating instructions to the output components 25 of the nodes 20 to produce the outputs in accordance with gameplay instructions stored in a memory of the central unit 40, for each particular game), receive game performance data (e.g. game score), provide feedback to user, etc. The central unit 40 can also receive inputs from the nodes 20 and process the inputs to subsequently provide the specific operating instructions to the nodes 20 to produce the outputs in accordance with gameplay instructions stored in a memory of the central unit 40, for each particular game.

In an embodiment, the central unit 40 includes an outer case 49 with internal components stored therein and providing the computing functions. The internal components include a processor 43, memory 44 storing at least instructions to be executed by the processor 43 and all required traditional additional hardware components for proper functioning of the processor 43 and/or memory 44 (e.g. a motherboard (not shown) to which the processor 43 and the memory 44 are mounted or connected to). For example and without being limitative, the central unit 40 can receive sensor data from the nodes 20, process the sensor data, generate node instructions and send the node instructions to at least one of the nodes 20 for operation thereof, etc. As will be described in more details below, the node instructions can be based on the processed sensor data or can be independent therefrom.

In view of the above, in an embodiment, the memory 44 of the central unit 40 has stored thereon node instructions relative to games to be played by a user of the playground system 10, each game having a distinct game play pattern. In other words, the memory 44 of the central unit 40 includes instructions relative to how the output components 25 of each node 20 must be operated by the central unit 40 for each one of the plurality of different games to be played by a user of the playground system 10, in order to implement the specific game play pattern of each game.

One skilled in the art will understand that the data connection between the central unit 40 and the nodes 20 can be any type of connection which allow data transfer therebetween. For example and without being limitative, in an embodiment, the data connection between the central unit 40 and the nodes 20 is a wired connection. In an embodiment, the nodes 20 can be connected in a series configuration, through the wired connection, with one node 20 being connected to the central unit 40 and the other nodes being connected to one another in a series configuration, thereby reducing the quantity of wire required for connecting all the nodes 20 of the playground system 10 to the central unit 40. In an embodiment where nodes 20 are installed on a pre-existing playground structure, such a wired series configuration allows a substantially straightforward installation. One skilled in the art will also understand that, in an alternative embodiment, a wired connection with at least a portion of the nodes 20 (or all of the nodes 20) being connected to the central unit 40 in a parallel configuration can also be provided. In the case where a wired connection is used, the wired connection can further transmit the required electrical power to the nodes 20.

One skilled in the art will understand that, in an alternative embodiment (not shown), the data connection between the central unit 40 and the nodes 20 can also be a wireless connection, with each node 20 (or group of nodes 20) being provided with a local electrical source and the nodes 20 and the central unit 40 each including communication hardware components (not shown) (e.g. receiver/transceiver) to allow wireless connection therebetween. For example and without being limitative, in an embodiment, the nodes 20 and the central unit 40 can communicate over a wireless private area network (WPAN), using short-distance wireless network technology such as Infrared Data Association (IrDA), Wireless Universal Serial Bus (USB), Wi-Fi®, Bluetooth® or the like. One skilled in the art will also understand that other types of wireless communication network and/or communication technology could be used.

In an embodiment, the central unit 40 is a single (standalone) computing device having its memory 44 for storing instructions, data and the like and its processor 43. However, one skilled in the art will understand that, in an alternative embodiment (not shown), the central unit 40 can be embodied by a central computing device physically installed on the playground structure 18 and connected to at least one remote computing device (not shown), such as, for example and without being limitative, a server or the like. Each one of the user identification module 50, speech recognition module 70, motion recognition module 75, personalised interaction management module 90 and interaction control module 80 (which will be described in details below) can be partially or entirely embodied on the standalone computing device or on the remote computing device(s) communicating with one another over a network, such as, for example and without being limitative, a local area network (LAN), a wide area network (WAN) such as the Internet, or the like. Moreover, the data collections (e.g. the databases) with which the above described user identification module 50, speech recognition module 70, motion recognition module 75 personalised interaction management module 90 and interaction control module 80 can be in data communication (which will also be described in more details below) and can also be installed directly on the standalone computing device, on the remote computing device(s) communicating with one another over a network or on third party computing devices communicating with the above, over the network.

Still referring generally to FIGS. 1 to 4, in an embodiment, the playground system 10 includes a user interface 45 configured to allow remote interactions between the user and the central unit 40 unit (i.e. configured to allow a user to control the central unit 40 (or give command to the central unit 40) without physical interaction therebetween, for the central unit 40 to subsequently implement conversation instructions through output of audio data on a speaker 42, 26 and/or game action instructions through control of the output component 25 of the nodes). As will be described in more details below, the components of the user interface 45 can be components of the central unit 40 (i.e. be included directly on the central unit 40 or onto the playground structure 18 and in data communication with the central unit 40) or components of the nodes 20. In the embodiment shown, the user interface 45 includes a display 46, a microphone 41, the speaker 42 and a camera 48, each being part of the central unit 40, to allow the remote communication between the user and the central unit 40. In the embodiment shown, the user interface 45 also includes push buttons 47 installed on the central unit 40. One skilled in the art will understand, that, in an embodiment, the user interface 45 could also include a microphone 21, a camera 27 and the abovementioned speaker 26, included in the nodes 20, and connected to the PCB 22 thereof. In view of the above, it will be understood that, in the description below, reference to the microphone 21, 41, the speaker 26, 42 and the camera 27, 48 can refer to either one or both of the microphone 21, 41, the speaker 26, 42 and the camera 27, 48 of the central unit 40 or the at least one node 20.

In addition, only one of the central unit 40 and the nodes 20 (or a subset thereof) can include each one of the microphone 21, 41, the camera 27, 48 and the speaker 26, 42, to form the user interface 45. In an embodiment, the user interface 45 can also be free of camera 27, 48. In alternative embodiments (not shown) the user interface 45 could also be implemented using components different that those of the embodiment shown.

The microphone 21, camera 27 and/or speakers 26 of the nodes 20 work in combination with the corresponding microphone 41, camera 48 and/or speakers 42 of the central unit 40 to acquire or output data. The distributed position of the nodes 20 allows a greater flexibility in the use of the microphone 21, camera 27 and/or speakers 26 of the nodes 20, while also allowing positional data to be acquired by the microphone 21 and the camera 27 when they acquire data (i.e. the data acquired using the microphone 21 and the camera 27 of the nodes 20 can be used to determine the position of the user when the data is acquired, given that the data acquired by each node 20 can be associated to a node 20 having a specific known position relative to the playground structure 18). In an embodiment, only one (or a subset) of nodes 20 can include a microphone 21 or a camera 27.

In an embodiment, the display 46 can provide visual feedback to the user, for example and without being limitative by displaying options of a selection menu for the user to make a selection therefrom and/or performance information such as scores of the user during a game session. The display 46 can also display any other relevant information or graphic which can allow the user to interact with the central unit 40 and/or increase the user experience. One skilled in the art will understand that, in an embodiment, the user interface 45 could be free of display 46.

The microphone 21, 41 and speaker 26, 42 allow the user interface 45 to be a conversational interface between the user and the central unit 40, where the user can command the central unit 40 via voice command instead of using manual input devices. The central unit 40 can also provide auditive feedback to the user through the speaker 26, 42. As will be described in more details below, to provide the conversational interface, the central unit 40 can further include a speech recognition module 70 acquiring user speech data from the microphone 21, 41, when a user gives vocal instructions, interpreting the acquired user speech data and generating user interaction instructions based on the interpreted user speech data. The user interaction instructions generated by the speech recognition module 70 can be used to subsequently output audio data (or vocal feedback) to the user on the speaker 26, 42), to engage or continue a conversation with the user, or to control the game play of the playground system 10 (i.e. implement game action instructions through control of the output component 25 of the nodes for users to interact with the playground structure 18 in the interactive experience corresponding to the selected game—for example and without being limitative to start (or restart) a game—pause a game, stop a game—start a new game, etc. using verbal command). For example and without being limitative, this allows a user to simply restart a game by saying a voice command, instead of having to make a more complicated or time consuming interaction with the playground system 10. Details regarding functioning and components of the speech recognition module 70 are provided below.

In an embodiment, the camera 27, 48 can also allow the user interface 45 to use motion (or gestures) of the user to command the central unit 40 via user motion command instead of using manual input devices, thereby providing a motion tracking interface between the user and the central unit 40. To provide the motion tracking interface, the central unit 40 can further include a motion recognition module 75 acquiring user motion data from the camera 27, 48, when a user provides motion instructions, interpreting the acquired user motion data and generating user interaction instructions based on the interpreted user motion data. The user interaction instructions generated by the motion recognition module 75 can be used to subsequently output audio data (or vocal feedback) to the user on the speaker 26, 42), to engage or continue a conversation with the user, or to control the game play of the playground system 10 (i.e. implement game action instructions through control of the output component 25 of the nodes for users to interact with the playground structure in the interactive experience corresponding to the selected game—for example and without being limitative to start (or restart) a game—pause a game, stop a game—start a new game, etc. using user motion command). For example and without being limitative, this allows a user to simply restart a game by making a gesture, instead of having to make a more complicated or time consuming interaction with the playground system 10. Details regarding functioning and components of the motion recognition module 75 are provided below.

One skilled in the art will understand that, in an embodiment (not shown) the user interface could include only one of the microphone 21, 41 and the camera 27, 48.

The push buttons 47 can be buttons used to provide user input, for example for selection of a game by the user, confirmation of a user command, etc., to allow a user to provide a command to the central unit 40 in cases where vocal or motion-based commands are not appropriate (such as when loud noises prevent the user from providing vocal commands or high user action prevent the user from providing motion-based commands). One skilled in the art will understand that, in alternative embodiments (not shown), other manual input devices different than the push buttons 47 of the embodiment shown, such as, for example and without being limitative, a joystick, a touchscreen, a keyboard, a touchpad, a trackball or the like could also be used to supplement the verbal or motion-based input devices of the user interface 25. One skilled in the art will understand that, in an embodiment (not shown), no manual input devices could be provided for the user interface 45.

Still referring generally to FIGS. 1 to 4, in an embodiment, to provide personalised user management and interaction capabilities for the playground system 10, the central unit 40 further includes a user identification module 50 for automatically identifying user(s) of the playground system 10, the speech recognition module 70 for automatically acquiring and interpreting user speech data from the user and generating corresponding instructions, a personalised interaction management module 90 for determining personalised and/or contextual user interaction and generating corresponding instructions and an interaction control module 80 for implementing the instructions generated by the speech recognition module 70 and the personalised interaction management module 90.

As mentioned above, in an embodiment, the central unit 40 further includes the above-mentioned motion recognition module 75 for automatically acquiring and interpreting user motion data from the user and generating corresponding instructions.

Figure 3:
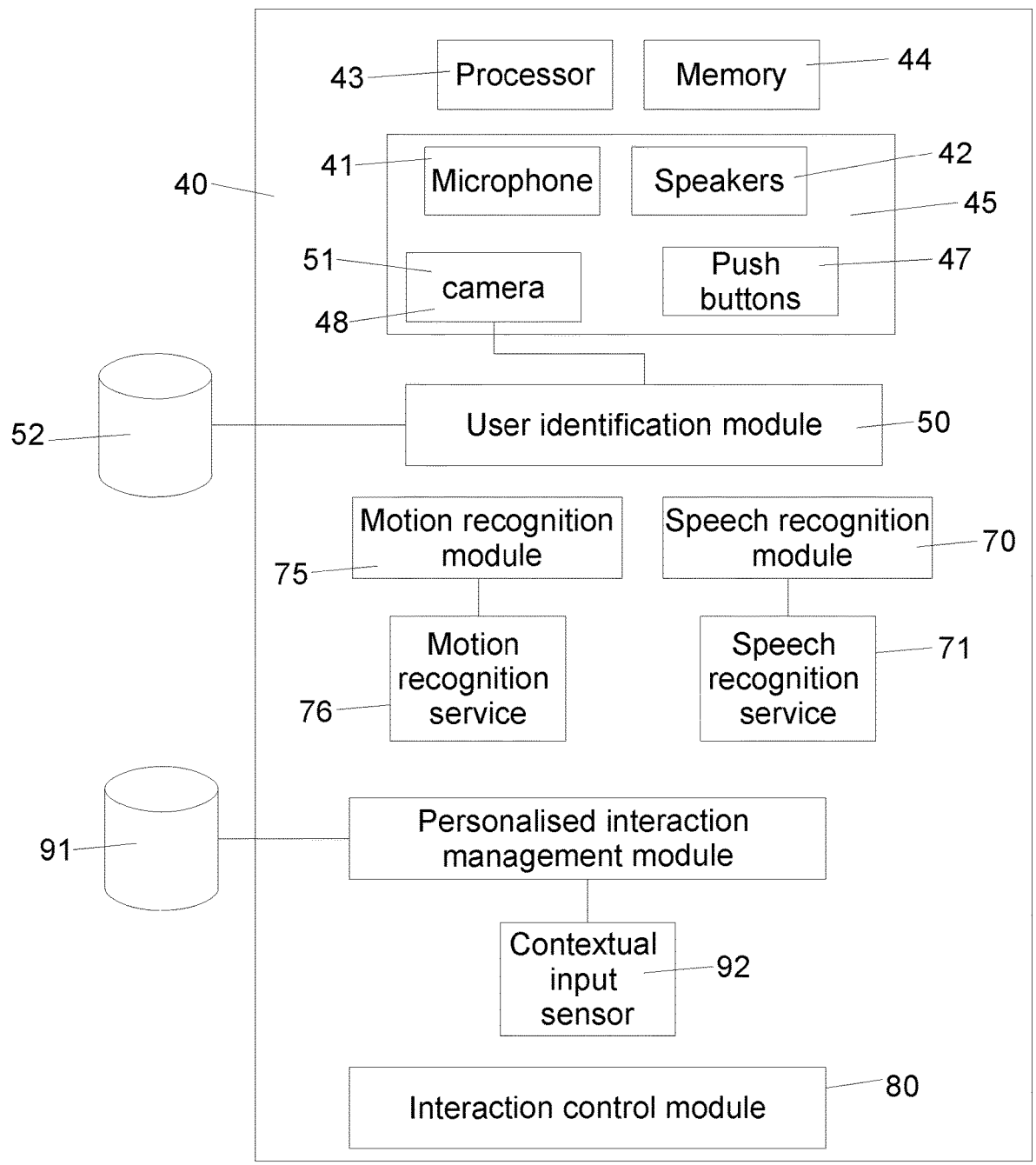
FIG. 3 is a schematic representation of a central unit of the playground system of FIG. 1.

To allow proper operation of the user identification module 50, in an embodiment, the central unit 40 further includes a user identification sensor 51 (embodied by the camera 48 in FIG. 3). One skilled in the art will also understand that at least one of the nodes 20 can also include a user identification sensor 23 (shown as the camera 27 in FIG. 2), to allow enhanced operation of the user identification module 50. Once again, the user identification sensor 23 of the nodes 20 work in combination with the corresponding user identification sensor 51 of the central unit 40 to acquire or output data. One skilled in the art will understand that, in an alternative embodiment (not shown), only one of the central unit 40 and the nodes 20 (or a subset thereof) can include a user identification sensor 23, 51 (shown as a camera 27, 48 in FIGS. 2 and 3).

As mentioned above, the user identification module 50 is operative to identify a user which is physically present at the site of the playground system 10 and wants to use the playground system 10 to play. The user identification module 50 is in data communication with the user identification sensor 23, 51 (of the central unit 40 and/or the nodes 20) and a user identification database 52 storing user identification data relative to the user and used by the user identification module 50 to identify the user.

In an embodiment, the user identification module 50 initially acquires the user identification data for a new user, using the user identification sensor 23, 51, and stores the acquired user identification data in the user identification database 52. For example and without being limitative, in a preferred embodiment, the user identification sensor 23, 51 includes the one or more digital camera(s) of the user interface 45 acquiring image(s) of a face of a user and storing the image(s) (or facial feature data derived from the acquired image(s)) in the user identification database 52, for the associated user. In order to perform such operation, in an embodiment, the user identification module 50 is connected to the speaker(s) 42, 26 of the user interface 45 and generates instructions to be implemented by outputting voice data instructing a user to stand in the field of view of the identification sensor 23, 51 for its initial identification, while the identification sensor 23, 51 acquires the image(s). One skilled in the art will understand that, in an alternative embodiment, the image(s) can also be acquired by the identification sensor 23, 51 while the user stands in the field of view of the identification sensor 23, 51, without vocal indications to that effect.

Once the user identification data for a new user has been acquired by the user identification module 50, to perform subsequent user identification, the user identification module 50 can subsequently obtain the user identification data of a user present at the playground structure 18 from the user identification sensor 23, 51 (of the central unit 40 and/or the nodes 20), process the acquired user identification data of the user (if necessary) and compare the acquired (or processed) user identification data with corresponding user identification data of the user identification database 52 to identify the user. In an embodiment, the user identification module 50 then generates user data representative of the identified user. In the above-described embodiment where user identification is performed by facial recognition, the user identification module 50 can include facial recognition software to perform the matching of the acquired (or processed) user identification data with the corresponding user identification data. One again, the identification can be performed with the user identification module 50 generating instructions to be implemented by outputting voice data instructing the user to stand in front of the camera(s) for identification while the user identification sensor 23, 51 acquires the image(s).

One skilled in the art will understand that, in alternative embodiments, the user identification module 50 can be configured to use identification different from the above-described facial recognition to perform the user identification. For example and without being limitative, in an embodiment, other biometrics (e.g. fingerprints or the like), codes (e.g. QR codes, or the like), or any other user specific identification feature can be used. As will be readily understood, the user identification sensor 23, 51 (of the central unit 40 and/or the nodes 20) and other features of the user identification module 50 must be adapted to the type of identification used. For example and without being limitative, in an embodiment, the user identification sensor 23, 51 can be a biometric sensor different than the above-mentioned camera(s), a code scanner, etc.

As mentioned above, the speech recognition module 70 is operative to automatically acquire and interpret user speech data from the user. The speech recognition module 70 is in data communication with the microphones 21, 41 of the user interface 45 and a speech recognition service 71. In an embodiment, the speech recognition service 71 is any service that can perform automatic speech recognition based on acquired user voice data. For example and without being limitative, in an embodiment, known services such as Alexa Voice Service by Amazon®, or voice recognition API from Apple® or IBM® can be used.

The speech recognition module 70 is in data communication with the interaction control module 80, which is in turn in data communication with the speakers 26, 42 of the user interface 45 and the nodes (i.e. the output components 25 of the nodes 20) to implement instructions generated therefrom and therefore provide the output relative to the user speech data acquired and interpreted by the speech recognition module 70, as will be described in more details below.

In view of the above, the speech recognition module 70 can acquire user speech data using the microphones 21, 41 of the user interface 45, interpret the acquired user speech data (e.g. by obtaining interpretation data (or interpretation results) from the speech recognition service 71 representative of the interpretation of the acquired user speech data by the speech recognition service 71) and generate user interaction instructions based on the interpreted user speech data previously acquired. The generated user interaction instructions can be of several types. In an embodiment, the user interaction instructions can be conversation instructions (i.e. instructions relative to audio data to be outputted through the speaker(s) 26, 42 to engage or continue a bi-directional interaction between the system 10 and the user involving an audio output by the user interface 45 (or simply provide user entertainment in the form of songs, jokes, suggestion of games to be played by the user (using the playground structure 18 or not), etc.)) or game action instructions relative to the conduct of a game session. For example and without being limitative, the conversation instructions can control the audio data to be outputted through the speaker(s) 26, 42 to provide an answer to a user question, provide a question for the user to answer, provide audio feedback relative to the performance of a user during or after a game session, or simply provide user entertainment. For example, the game action instructions can be node instructions by the central unit 40 to the nodes 20 (i.e. instructions for controlling the operation of the output components 25 of the nodes 20) and resulting in starting a game (or restarting a game), pausing a game, stopping a game, changing the game being played, etc. One skilled in the art will easily understand that node instructions by the central unit 40 to the nodes 20 relative to a game session can be combined to conversation instructions to vocally inform the user of the action relative to the game play being taken.

For example, in an embodiment, the possible user interaction instructions can be stored in an interaction database, with each possible instruction being associated to an interpretation of the acquired user speech data (i.e. a result of interpretation of the acquired user speech data by the speech recognition service 71).

The user interaction instructions are transmitted to the interaction control module 80, which receives the user interaction instructions and implements the instructions by controlling the corresponding one of the speaker(s) 26, 42 and/or the nodes 20 to output the required data, to carry the user interaction instructions and provide the interaction with the user(s).

Hence, the combination of the user interface 25, the speech recognition module 70 and the interaction control module 80 allows vocal interaction between the playground system 10 and the user, similarly to a virtual park monitor that listens to sounds emitted by users in the vicinity of the playground system 10, interprets the sounds to determine the meaning thereof and provides a response, either in the form of a vocal response (i.e. conversation instructions relative to audio data to be outputted through the speaker(s) 26, 42), a game action control (i.e. game action instructions for controlling the operation of the output components 25 of the nodes 20), or both.

In an embodiment, the microphones 21, 41 of the user interface 45 are constantly in listening mode in order to be able to acquire the user speech data as it is produced by a user, without requiring previous user action from the user. In an embodiment, the listening mode can be triggered by an event such as, for example and without being limitative, movement of the user, detected by a camera 27, 48 of the user interface 45 (or other movement sensor). In an embodiment, the speech recognition module 70 can further be configured to perform noise filtering to remove ambient noise from the acquired speech data and facilitating the interpretation of the speech data.

As mentioned above, the motion recognition module 75 is operative to automatically acquire and interpret user motion data from the user. The motion recognition module 75 is in data communication with the camera 27, 48 of the user interface 45. In an embodiment, the motion recognition module 75 can be in data communication with a motion recognition service 76 configured to perform automatic motion recognition based on acquired user motion data. In an embodiment, the motion recognition service 76 is any service that can perform automatic motion recognition based on acquired user motion data. For example and without being limitative, in an embodiment, motion recognition API from Microsoft®.

The motion recognition module 75 is in data communication with the interaction control module 80, which is in turn in data communication with the speakers 26, 42 of the user interface 45 and the nodes (i.e. the output components 25 of the nodes 20) to implement instructions generated therefrom and therefore provide the output relative to the user motion data acquired and interpreted by the motion recognition module 75, as will be described in more details below.

In view of the above, the motion recognition module 75 can acquire user motion data using the cameras 27, 48 of the user interface 45, interpret the acquired user motion data (e.g. by obtaining interpretation data (or interpretation results) from the motion recognition service 76 representative of the interpretation of the acquired user motion data by the motion recognition service 76) and generate user interaction instructions based on the interpreted user motion data previously acquired. Similarly to the speech recognition module 70, the generated user interaction instructions can be of several types. Given that the user interaction instructions are similar to those discussed above in relation with the speech recognition module 70, the description and possible implementation thereof will not be repeated herein. Once gain, the user interaction instructions are transmitted to the interaction control module 80, which receives the user interaction instructions and implements the instructions by controlling the corresponding one of the speaker(s) 26, 42 and/or the nodes 20 to output the required data, to carry the user interaction instructions and provide the interaction with the user(s).

Hence, the combination of the motion recognition module 75 and the interaction control module 80 allows movements of the user to be used for interaction between the playground system 10 and the user, similarly to a virtual park monitor that monitors the movement of the user, interprets the movements to determine the meaning thereof and provides a response, either in the form of a vocal response (i.e. conversation instructions relative to audio data to be outputted through the speaker(s) 26, 42), a game action control (i.e. game action instructions for controlling the operation of the output components 25 of the nodes 20), or both In an embodiment, the cameras 27, 48 of the user interface 45 are constantly in operative mode in order to be able to acquire the user motion data as it is produced by a user, without requiring previous user action from the user. In an embodiment, the operative mode can be triggered by an event such as, for example and without being limitative, noise detected by microphone 21, 41 of the user interface 45, or the like.

As mentioned above, the personalised interaction management module 90 is operative to provide personalised and/or contextual user interaction and playground experience to the user identified by the user identification module 50. In an embodiment, the personalised interaction management module 90 is in data communication with the interaction control module 80. As will be described in more details below, the personalised interaction management module 90 generates at least one of user specific conversation instructions, personalised user interaction instructions and contextual user interaction instructions communicated to the interaction control module 80 and implemented thereby.

In an embodiment, the personalised interaction management module 90 is in data communication with the user identification module 50 and receives personal user data relative to the user identified by the user identification module therefrom. The personalised interaction management module 90 processes the personal user data and generates the user specific conversation instructions therefrom. For example, in an embodiment, the personal user data includes the name (or nickname) of the user and/or any other personal information of the user, such as its date of birth (which can be used to determine its age), its age group, etc. Such personal user data can be acquired during the initial user identification process (for example using the speech recognition module 70 described above, a keyboard, or any other input device which allows a user to input its personal data). In an embodiment, the personal user data can be stored in the user identification database 52, in association with the user identification data of the user. Hence, when a user is identified by the user identification module 50, the personalised interaction management module 90 can, for example and without being limitative, generate the user specific conversation instructions including a greeting of the user using the name of the user, birthday wishes if today is the birthday of the user, etc. The user specific conversation instructions can subsequently be transmitted to the interaction control module 80 for subsequent output of the corresponding audio data through the speaker(s) 26, 42 of the user interface 45. One skilled in the art will understand that, in an alternative embodiment, the personal user data can be stored in a different database (not shown), with a user identifier to associate the data with the specific user.

In an embodiment, the personalised interaction management module 90 is also in data communication with a user preference data database 91 and is configured to analyze (or track) the use of the playground system by the user over time (i.e. analyze the parameters associated with the user while the user uses the playground system over time). For example and without being limitative, the factors analyzed can include the types of games (e.g. competitive game, casual games, etc.) and/or the specific game the user mostly plays, the performance data (e.g. scores) of the user for different types of games or specific games, etc. The analyzed parameters can also relate to the social network of the user (i.e. the social relations between a user and other users of the playground system 10). For example and without being limitative, the social network can be analyzed by tracking the other users with which a user plays most often. In an embodiment, this can be embodied by tracking and storing (for example and without being limitative in the user preference data database 91 or another storage unit) a numerical value representing the amount of times a user plays with another user on the playground system 18 and ranking the closeness of the users (i.e. ranking the intensity of the social connection between two users) based on the stored numerical value for two specific users. In other words, the more time two users are logged as active in the playground system 10 at the same time, the more the playground system 10 will consider them to be close friends.

In view of the above, one skilled in the art will understand that the analysis of the use of the playground system 10 by the user over time can therefore include game data to identify play patterns of each specific user, user relation data (i.e. data relative to the social network of each specific user) to identify the social relation between the users, etc. Using the above described analysis of the use of the playground system 10 by the user over time, the personalised interaction management module 90 then generates user preference data specific to the user and stores the user preference data in the user preference data database 91.

Hence, when a user is identified by the user identification module 50, the personalised interaction management module 90 can be configured to retrieve the user preference data from the user preference data database 91 and use the user preference data in the generation of the personalised user interaction instructions. It will be understood that the user preference data used in the generation of the personalised user interaction instructions can relate to a single identified user or a combination of identified users. For example and without being limitative, the user preference data can be used to generate personalised user interaction instructions in the form of conversation instructions including a suggestion to the user to play a game he often plays; a suggestion to a user to try a new game he never played; a suggestion to a user to practice a game often played by one of his friend (i.e. another user with which the user plays most often); a suggestion that a group of users play a game each individual likes or a game they often play as a group; a suggestion that a group of users plays a game that corresponds to a type of game liked by each individual user of the group or most users of the group; etc. The user preference data can also be used to generate personalised user interaction instructions in the form of conversation data and/or game action instructions relative to team management, where the performance of the users of a group of users and/or the user interaction are used, for example, to generate and/or suggest teams having a balance between even strength and the users being in the same team as their friends (i.e. the users that are most commonly identified as being at the same time at the playground system 10). The user preference data can further be used to generate personalised user interaction instructions in the form of conversation data relative to user relations where, for example, when the system 10 is discussing with a user, the data relative to the social network of the user is used to determine that the user has a friend with its birthday on this day or in the coming days and reminds the user to wish happy birthday to his friend. The personalised user interaction instructions can subsequently be transmitted to the interaction control module 80 for subsequent output of the corresponding audio data through the speaker(s) and/or control of the output components 25 of the nodes 20 (through node instructions) to control the game action.

In an embodiment, the personalised interaction management module 90 is also in data communication with at least one contextual input source and/or sensor 92 providing contextual data relative to the current context, such as, for example and without being limitative, the current time of year, the physical environment of the playground system 10, the number of players currently playing on the playground system 10, etc. For example, in an embodiment, the contextual input source and/or sensor 92 can be a calendar source indicative of the time of year and the corresponding current or nearby holidays, or the like. In an alternative embodiment, the contextual input source and/or sensor 92 can include a temperature sensor or source providing temperature data for the site of the playground system 10. In an embodiment, the contextual data can be processed by the personalised interaction management module 90 and be used to generate the contextual user interaction instructions either in the form of conversation instructions or game action instructions, such as, a suggestion to the user to play a targeted game for a specific time of year or particular current or nearby holiday; a suggestion of a shorter game or stopping the game if bad weather (e.g. rain or the like) is currently hitting the site of the playground system 10 or is likely to hit the site of the playground system 10 soon; a suggestion to pause or stop a game if bad weather (e.g. rain or the like) is currently hitting the site of the playground system 10. The contextual user interaction instructions can subsequently be transmitted to the interaction control module 80 for subsequent output of the corresponding audio data through the speaker(s) 26, 42 and/or control of the output components 25 of the nodes 20 (through node instructions) to control the game action.

In most cases, the user interaction instructions are generated by the speech recognition module 70 and/or the motion recognition module 75 and the user specific conversation instructions, personalised user interaction instructions and contextual user interaction instructions are generated by the personalised interaction management module 90 at specific trigger time (for example directly following the identification of a new user, in response to vocal command by the user, following a specific game action (end of game, new level reached, etc.)) or to provide feedback or query the user regarding a possible game action in accordance to the performance of the user during a game session. One skilled in the art will however understand that, in an embodiment, the personalised interaction management module 90 can be configured to further generate one of user specific conversation instructions, personalised user interaction instructions and contextual user interaction instructions freely (i.e. without reacting to the game action or a user command) simply to enhance the entertainment value of the playground system 10. For example and without being limitative, in an embodiment, the personalised interaction management module 90 is configured to generate and transfer the user specific conversation instructions, personalised user interaction instructions and/or contextual user interaction instructions to the interaction control module 80 at a random or quasi-random time (for example after a predetermined or random period marking inactivity), to entertain the user and therefore mimic the conduct of a traditional human camp monitor. For example and without being limitative, the user specific conversation instructions, personalised user interaction instructions and/or contextual user interaction instructions can be generated in the form of conversation instructions including a joke, a story, a song, a comment, or the like, in order to maintain user interest. In an embodiment, the user preference data, the personal user data and/or the contextual data are used in the selection of the supplemental user interaction instructions. Indeed, for example, the type of joke can be selected to the age of the identified user(s), a joke, story or song can be selected according to the current period of the year, etc.

Figure 4:
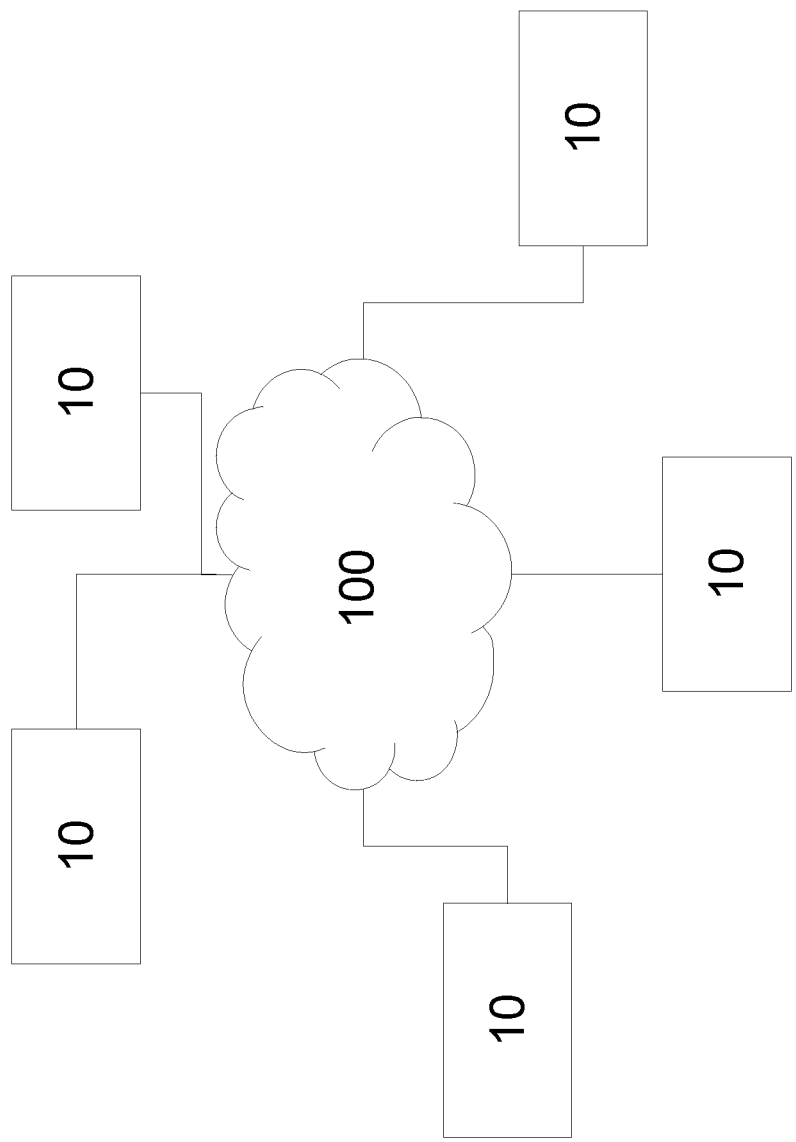
FIG. 4 is a schematic representation of a network of playground systems in accordance with FIG. 1.

Referring to FIG. 4, in an embodiment, the central unit 40 of the playground system 10 is connected to a network 100. In an embodiment, the connection of the central unit 40 of the playground system 10 to the network 100 can allow remote updates to be installed (for example to correct bugs, install new games, etc.). The connection of the central unit 40 of the playground system 10 to the network 100 can further allow inter-playground interactions (i.e. interactions for users physically present in different remote interactive playgrounds 10). For example and without being limitative, in an embodiment, the user preference data, the personal user data and/or the contextual data of a user or a group of users at a specific playground system 10 can be used to connect users of different playground systems 10. In an embodiment, the interaction management module 90 can hence generate user specific conversation instructions, personalised user interaction instructions and/or contextual user interaction instructions in the form of conversation instructions or game action instructions such as, a suggestion to the user to play a game against an adversary present at a remote playground system 10, starting, stopping, pausing game action at multiple playground systems 10 simultaneously, or the like.

In view of the above, it will be understood that the combination of the user interface 45 and the specific modules of the central unit 40 (i.e. the user identification module 50, speech recognition module 70, motion recognition module 75, personalised interaction management module 90 and interaction control module 80) allow the playground system 10 to handle interactions with the user of the playground system 10 and therefore creates the interactive and immersive experience, by, for example, providing speech recognition; user recognition; keeping track of the behavior of the user(s); maintaining conversation with the user; answering questions and vocal input from the user; understanding the social network of the users and adapting instructions relative to this social network; creating and managing a communication network between the distant playground systems 10, etc.

Now that the interactive playground system 10 with enhanced user management and interaction capabilities has been described in detail above, a computerized method for providing personalized and/or contextual user interaction in a playground system will be described in detail below, with reference to FIGS. 5 to 5e.

Figure 5:
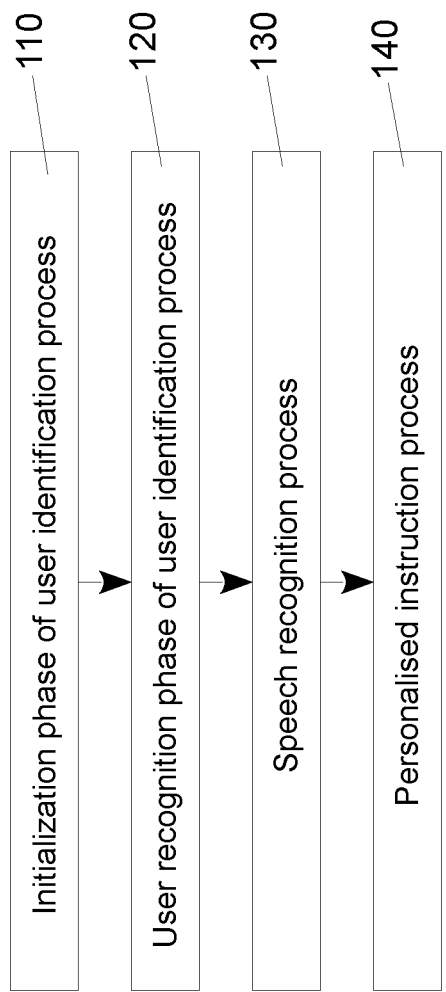
FIGS. 5 to 5e are flowcharts presenting the steps of a computerized method for providing personalized and/or contextual user interaction in a playground system, in accordance with an embodiment, where

Referring to FIGS. 5, 5a and 5b, in an embodiment, the method includes a user identification process for identifying at least one user present at the site of the playground system 10. In an embodiment, the user identification process includes an initialization phase 110 including the steps of, for each user, acquiring user identification data relative to a new user, using a user identification sensor 23, 51, and storing the acquired user identification data in a database 52. For subsequent presence of the user at the site of the playground system 10, the method includes a user recognition phase 120 including the steps of acquiring user identification data of the user, using the user identification sensor 23, 51, processing the acquired user identification data of the user (if necessary), matching the acquired (or processed) user identification data with corresponding user identification data stored in the corresponding database 52 to identify the current user and marking the identified user as being currently active on the playground system 10. For example and without being limitative, in an embodiment, the user recognition phase 120 of the user identification process can be performed before each game is played to identify the users currently active on the playground system 10. For example, the user recognition phase 120 of the user identification process can be performed after instructing the users to gather around (or close to) the central unit 40 (for example to receive game instructions or the like, with the identification of the user present being performed as the users are in the vicinity of the central unit 40). One skilled in the art will however understand that, in alternative embodiments, other methods or process can be used to identify the users currently active on the playground system (i.e. the users currently present at the site of the playground system 10 and ready to interact therewith).

Figure 5C:
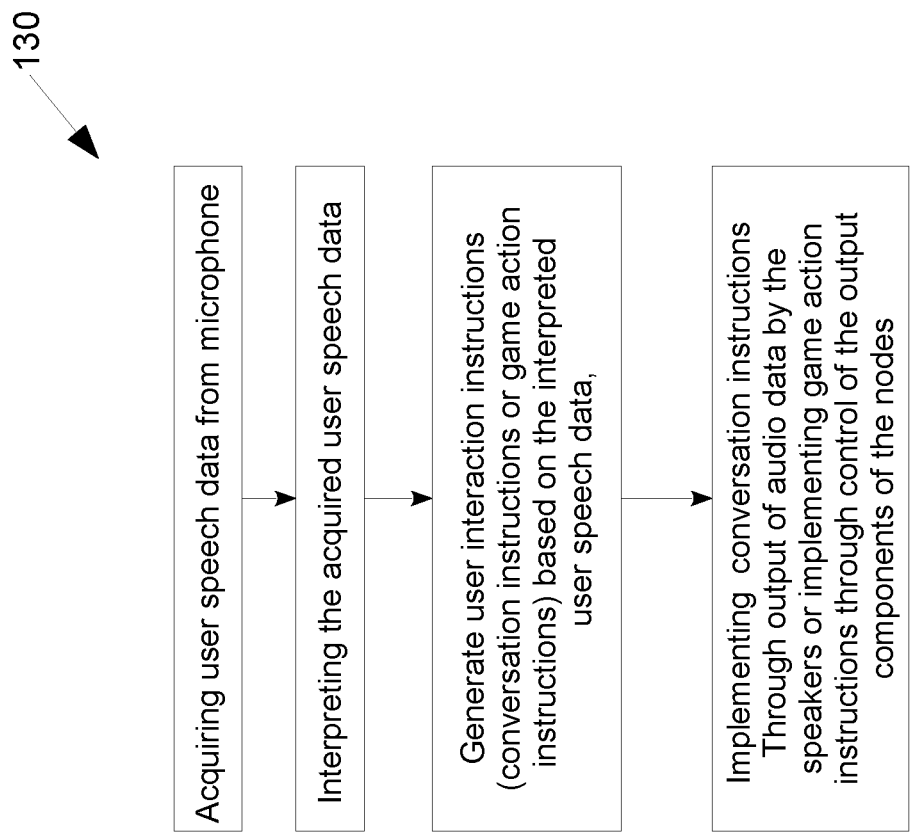
FIG. 5c presents the steps of a speech recognition process.

Referring to FIGS. 5 and 5c, in an embodiment, the method further includes a speech recognition process 130 for providing vocal interaction between the playground system and the user(s) and/or voice activated commands of the game action. In an embodiment, the speech recognition process includes acquiring user speech data from microphones 21, 41 connected to at least one of the central unit 40 and/or the nodes 20 of the playground system 10, interpreting the acquired user speech data (e.g. by obtaining results of interpretation of the acquired user speech data using a speech recognition service) and generate user interaction instructions based on the interpreted user speech data, the generated user interaction instructions being one of conversation instructions and game action instructions. The method further includes at least one of implementing (or performing) the conversation instructions through output of audio data by the speakers 26, 42 (of the central unit 40 and/or the nodes 20) and implementing the game action instructions through control of the output components of the nodes 20.

Figure 5D:
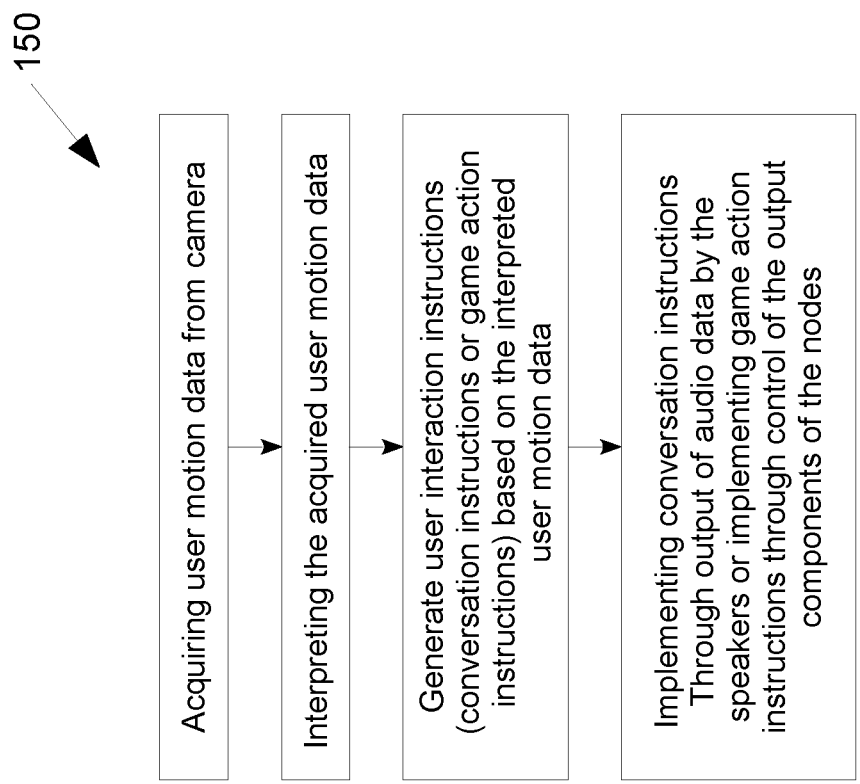

Referring to FIGS. 5 and 5d, in an embodiment, the method further includes a motion recognition process 150 for providing motion interaction between the playground system and the user(s) and/or motion activated commands of the game action. In an embodiment, the motion recognition process includes acquiring user motion data from cameras 27, 48 connected to at least one of the central unit 40 and/or the nodes 20 of the playground system 10, interpreting the acquired user motion data (e.g. by obtaining results of interpretation of the acquired user motion data using a motion recognition service 75) and generate user interaction instructions based on the interpreted user motion data, the generated user interaction instructions being one of conversation instructions and game action instructions. The method further includes at least one of implementing (or performing) the conversation instructions through output of audio data by the speakers 26, 42 (of the central unit 40 and/or the nodes 20) and implementing the game action instructions through control of the output components of the nodes 20.

Figure 5E:
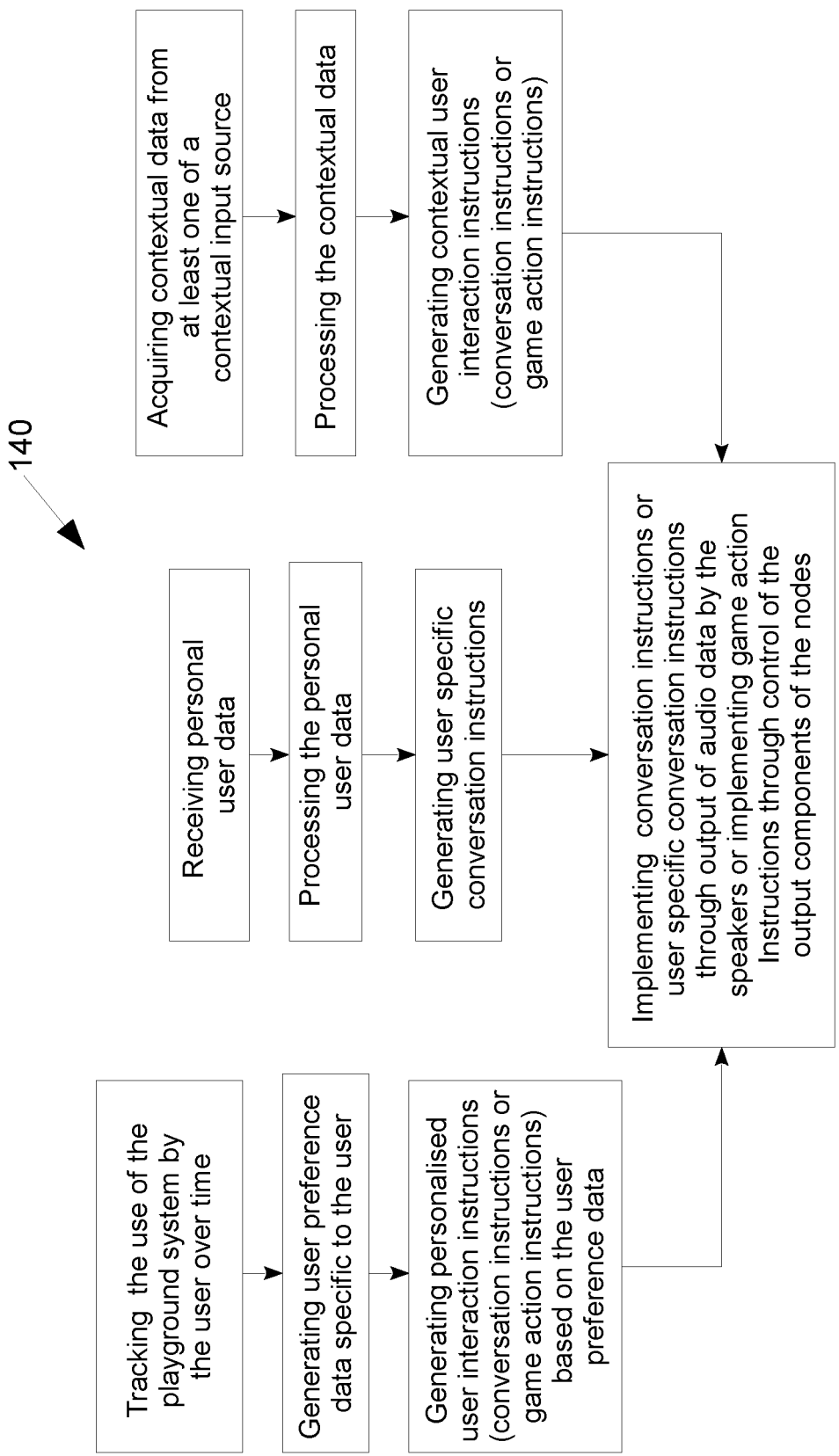

Referring to FIGS. 5 and 5e, in an embodiment, the method further includes a personalised instruction process 140 including receiving personal user data, processing the personal user data, generating user specific conversation instructions and implementing the user specific conversation instructions through output of audio data by the speakers 26, 42 (of the central unit 40 and/or the nodes 20). In an embodiment, the personal user data can be acquired during the initialization phase of the user identification process. In an embodiment, the method includes storing the personal user data in a corresponding database.

In an embodiment, the personalised instruction process further includes tracking (or analysing) the use of the playground system by the user over time, generating user preference data specific to the user and generating personalised user interaction instructions based on the user preference data. The generated personalised user interaction instructions are one of conversation instructions and game action instructions. The method further includes at least one of implementing the conversation instructions through output of audio data by the speakers 26, 42 (of the central unit 40 and/or the nodes 20) and implementing the game action instructions through control of the output components 25 of the nodes 20. As mentioned above, the user preference data used in the generation of the personalised user interaction instructions can relate to a single identified user or a combination of the identified users. In an embodiment, the user preference data can be stored in a database 91 and retrieved by the interaction control module 80, with the personalised user interaction instructions being generated by the interaction control module 80.

In an embodiment, the personalised instruction process further includes acquiring contextual data from at least one of a contextual input source and a contextual input sensor, processing the contextual data and generating contextual user interaction instructions. The generated contextual user interaction instructions are one of conversation instructions and game action instructions. The method further includes at least one of implementing the conversation instructions through output of audio data by the speakers 26, 42 (of the central unit 40 and/or the nodes 20) and implementing the game action instructions through control of the output components 25 of the nodes 20.

In an embodiment, the method further includes connecting a playground system 10 to at least one remote playground system over a network 100. The method also includes performing a game action including at least two users, where each user is identified as active in its corresponding playground system 10 and the playground systems of each user are remote from one another. In an embodiment, the method includes using at least one of the user preference data, the personal user data and/or the contextual data of users of remote playground systems 10 to connect users physically present at remote playground systems 10.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An interactive playground system for a playground structure, the interactive playground system comprising:
a plurality of nodes distributed over a surface of the playground structure, each one of the nodes including a printed circuit board with at least one sensor detecting an interaction between a user and a component of the playground structure, and at least one output component connected thereto; and
a central unit in data communication with the plurality of nodes, the central unit comprising:
a user interface including a speaker and at least one of a microphone and a camera;
a memory and a processor;
at least one of a speech recognition module in data communication with the microphone and a speech recognition service and a motion recognition module in data communication with the camera and a motion recognition service, the speech recognition module acquiring user speech data from the microphone, transmitting the user speech data to the speech recognition service, obtaining speech interpretation data from the speech recognition service and generating user interaction instructions based on the speech interpretation data and the motion recognition module acquiring user motion data from the camera, transmitting the user motion data to the motion recognition service, obtaining motion interpretation data from the motion recognition service and generating user interaction instructions based on the motion interpretation data, the user interaction instructions including conversation instructions and game action instructions; and
an interaction control module in data communication with the at least one of the speech recognition module and the motion recognition module, the speaker and the nodes, the interaction control module implementing the conversation instructions through output of audio data on the speaker and the game action instructions through control of the output components of the plurality of nodes, in accordance with gameplay instructions stored in the memory of the central unit.

2. The interactive playground system of claim 1, wherein at least one of the nodes and the central unit comprises a user identification sensor including the camera of the user interface and wherein the central unit comprises a user identification module in data communication with the user identification sensor and a user identification database, the user identification module acquiring user identification data from the user identification sensor, and identifying the user by comparing the user identification data with user identification data of the user identification database.

3. The interactive playground system of claim 1, wherein the playground system is connected to at least one remote playground system via a network.

4. The interactive playground system of claim 2, wherein the central unit further comprises a personalised interaction management module in data communication with the user identification module, the personalised interaction management module receiving personal user data relative to the user identified by the user identification module, processing the personal user data and generating user specific conversation instructions therefrom, the interaction control module implementing at least one of the conversation instructions and the user specific conversation instructions through output of audio data on the speaker.

5. The interactive playground system of claim 4, wherein the personalised interaction management module analyzes the use of the playground system by the user over time, generates user preference data specific to the user and generates personalised user interaction instructions based on the user preference data, the generated personalised user interaction instructions being one of the conversation instructions to be implemented by the interaction control module through output of audio data on the speaker and the game action instructions to be implemented by the interaction control module through control of the output components of the nodes.

6. The interactive playground system of claim 5, wherein the personalised interaction management module is in data communication with a user preference data database, the personalised interaction management module transmitting the user preference data to the user preference data database for storage and subsequently retrieving the user preference data therefrom.

7. The interactive playground system of claim 4, wherein the playground system includes at least one of a contextual source and a contextual sensor and the personalised interaction management module is in data communication therewith and receives contextual data therefrom, the personalised interaction management module processing the contextual data and generating contextual user interaction instructions, the generated contextual user interaction instructions being one of the conversation instructions to be implemented by the interaction control module through output of audio data on the speaker and the game action instructions to be implemented by the interaction control module through control of the output components of the nodes, the personalised interaction management module processing the contextual data in combination with the personal user data and the user preference data to generate the contextual user interaction instructions.

8. The interactive playground system of claim 1, wherein each one of the nodes includes a processor and memory.

9. The interactive playground system of claim 1, wherein the at least one output component connected to the printed circuit board of at least one of the plurality of nodes includes at least one of a speaker and a light emitter.

10. A computer implemented method for providing personalized user interaction in a playground system for a playground structure, the playground system having a central unit including a user identification sensor, a microphone and a speaker and a plurality of nodes distributed over the playground structure and including output elements and at least one sensor detecting an interaction between a user and a component of the playground structure, the method comprising:
  a user identification process including:
    acquiring user identification data of the user from the user identification sensor;
    matching the user identification data with corresponding user identification data stored in a database to identify the current user; and
    marking the identified user as being currently active on the playground system;
  a speech recognition process including:
    acquiring user speech data from the microphone;
    interpreting the acquired user speech data;
    generating user interaction instructions based on the interpreted user speech data, the generated user interaction instructions including conversation instructions and game action instructions; and
    implementing the conversation instructions through output of audio data by the speaker of the central unit and implementing the game action instructions through control of the output components of the plurality of nodes, in accordance with gameplay instructions stored in a memory of a central unit, and detection of interactions of the users with a corresponding component of the playground structured by the at least one sensor of the corresponding node;
  a personalised instruction process including:
    receiving personal user data;
    processing the personal user data;
    generating user specific conversation instructions; and
    implementing the user specific conversation instructions through output of audio data by the speaker.

11. The method of claim 10, wherein the method further includes connecting a playground system to at least one remote playground system over a network and performing a game action including at least two users, where each user is identified as active in its corresponding playground system and the playground systems of each user are remote from one another.

12. The method of claim 10, wherein the playground system includes at least one of a contextual input source and a contextual input sensor and the personalised instruction process further includes:
  acquiring contextual data from the at least one of the contextual input source and the contextual input sensor;
  processing the contextual data;
  generating contextual user interaction instructions, the generated contextual user interaction instructions being one of the conversation instructions and the game action instructions; and
  at least one of implementing the conversation instructions through output of audio data by the speaker and implementing the game action instructions through control of the output components of the nodes.

13. The computer implemented method of claim 10, wherein the playground system includes a camera, the method further comprising a motion recognition process including:
  acquiring user motion data from the camera;
  interpreting the acquired user motion data;
  generating the user interaction instructions based on the interpreted user motion data, the generated user interaction instructions being one of the conversation instructions and the game action instructions; and
  at least one of implementing the conversation instructions through output of audio data by the speaker and implementing the game action instructions through control of the output components of the nodes.

14. The method of claim 10, wherein the user identification process includes an initialization phase including, for each user, acquiring user identification data relative to the user and storing the acquired user identification data in a database and acquiring the personal user data from the user and storing the personal user data in a database.

15. The method of claim 10, wherein the personalised instruction process further includes:
  analyzing the use of the playground system by the user over time;
  generating user preference data specific to the user based on the analysis;
  generating personalised user interaction instructions based on the user preference data, the generated personalised user interaction instructions being one of the conversation instructions and the game action instructions;

storing the user preference data in a database and subsequently retrieving the user preference data therefrom; and at least one of implementing the conversation instructions through output of audio data by the speaker and implementing the game action instructions through control of the output components of the nodes.

* * * * *